US007970103B1

(12) United States Patent
Hynes et al.

(10) Patent No.: US 7,970,103 B1
(45) Date of Patent: Jun. 28, 2011

(54) INTERROGATING HIDDEN CONTENTS OF A CONTAINER

(75) Inventors: Michael V. Hynes, Cambridge, MA (US); Bernard Harris, Waltham, MA (US); Brandon Blackburn, Idaho Falls, ID (US); John E. McElroy, North Andover, MA (US); Richard C. Lanza, Brookline, MA (US); Timothy A. Antaya, Hampton Falls, NH (US); Richard Sheffield, Los Alamos, NM (US); John T. Mihalczo, Oak Ridge, TN (US); Paul A. Hausladen, Oak Ridge, TN (US); Alan W. Hunt, Pocatello, ID (US); Hugh R. Andrews, Pembroke, CA (US); James Johnson, Rigby, ID (US)

(73) Assignee: Raytheon Company, Waltham, MA (US)

( * ) Notice: Subject to any disclaimer, the term of this patent is extended or adjusted under 35 U.S.C. 154(b) by 200 days.

(21) Appl. No.: 12/455,694

(22) Filed: Jun. 5, 2009

(51) Int. Cl.
*G01N 23/04* (2006.01)
*H05G 1/52* (2006.01)
*H01J 35/30* (2006.01)
(52) U.S. Cl. .................... 378/57; 378/113; 378/137
(58) Field of Classification Search ............. 378/57, 378/98.6, 113, 137
See application file for complete search history.

(56) References Cited

U.S. PATENT DOCUMENTS

| 6,542,574 | B2 * | 4/2003 | Grodzins | 378/57 |
| 6,954,515 | B2 * | 10/2005 | Bjorkholm et al. | 378/137 |
| 2007/0102646 | A1 * | 5/2007 | Goldberg | 250/390.01 |
| 2008/0240329 | A1 * | 10/2008 | Norman et al. | 376/154 |

OTHER PUBLICATIONS

Valentine, T.E., Paper entitled "*Passive Multiplicity Counting With The Nuclear Materials Identification System for Plutonium*", Oak Ridge National Laboratory, Oak Ridge, Tenn., www.ornl.gov/~webworks/cpr/pres/104067.pdf, 5 pages, Printed Apr. 2009.

* cited by examiner

*Primary Examiner* — Irakli Kiknadze
(74) *Attorney, Agent, or Firm* — Baker Botts L.L.P.

(57) ABSTRACT

According to one embodiment, a system for interrogating hidden contents of a container comprises a controller, a detector system, and a data system. The controller receives a selection of a source mode of source radiation to generate to interrogate contents of a container. The source mode selection comprises a neutron mode, a gamma ray mode, or a combined neutron-gamma ray mode. The controller instructs a cyclotron to generate the source radiation according to the source mode selection. The detector system detects radiation emitted from the contents in response to the source radiation. The data system analyzes the emitted radiation and describes the contents according to the analysis.

20 Claims, 6 Drawing Sheets

INTERROGATING HIDDEN CONTENTS OF A CONTAINER

TECHNICAL FIELD

This invention relates generally to the field of non-intrusive inspection systems and more specifically to interrogating hidden contents of a container.

BACKGROUND

In certain situations, contents that are hidden from view in a container may need to be identified. For example, contents of cargo may be identified to determine if the contents include threat materials. The contents may be interrogated by irradiating the container with a radiation source and analyzing radiation emitted by the contents in response to the source radiation.

SUMMARY OF THE DISCLOSURE

In accordance with the present invention, disadvantages and problems associated with previous techniques for interrogating hidden contents of a container may be reduced or eliminated.

According to one embodiment, a system for interrogating hidden contents of a container comprises a controller, a detector system, and a data system. The controller receives a selection of a source mode of source radiation to generate to interrogate contents of a container. The source mode selection comprises a neutron mode, a gamma ray mode, or a combined neutron-gamma ray mode. The controller instructs a cyclotron to generate the source radiation according to the source mode selection. The detector system detects radiation emitted from the contents in response to the source radiation. The data system analyzes the emitted radiation and describes the contents according to the analysis.

Certain embodiments of the invention may provide one or more technical advantages. A technical advantage of one embodiment may be that multiple detection modes are provided. For example, different inspection sources (such as neutrons or gamma rays or both) may be used to interrogate the contents of a container. As another example, different particle energies and/or different pulse rates may be used to interrogate the contents. As yet another example, pulsed or continuous radiation may be used to interrogate the contents. As yet another example, prompt and/or delayed emissions may be analyzed to identify the contents. As yet another example, different interrogation radiation may be used for multiple scans of the contents.

Another technical advantage of one embodiment may be that the system to interrogate contents is compact. The compact system may be rapidly deployable and/or covertly fielded. Another technical advantage of one embodiment may be that the neutrons and/or gamma rays may be used in low doses relative to known interrogation systems, yielding a safer interrogation system for cargo and for people in the area.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7B of the drawings, like numerals being used for like and corresponding parts of the various drawings.

Figure 1:
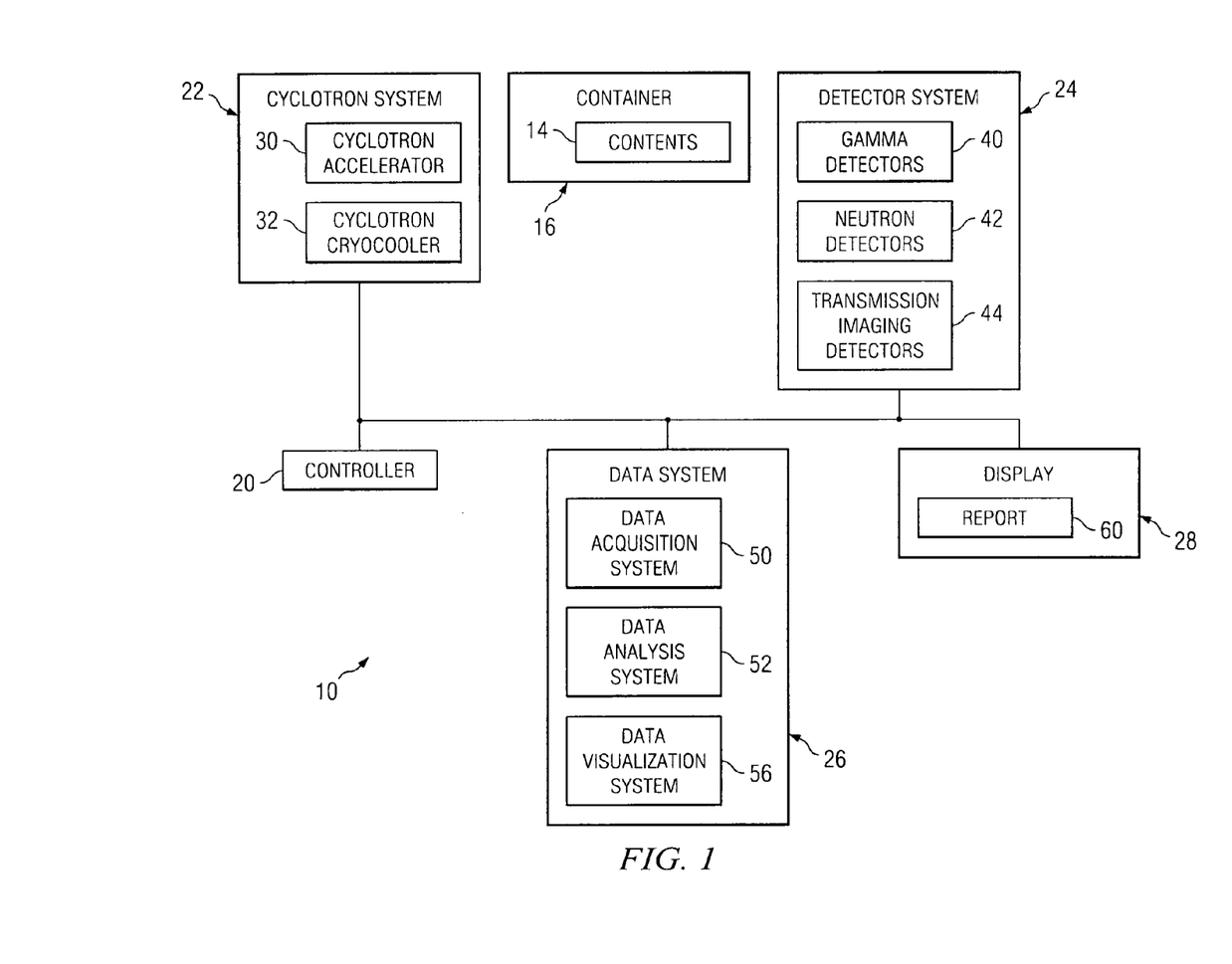
FIGS. 1 and 2 illustrate an embodiment of a system that may be used to interrogate contents that may be enclosed in a container.
Figure 2:
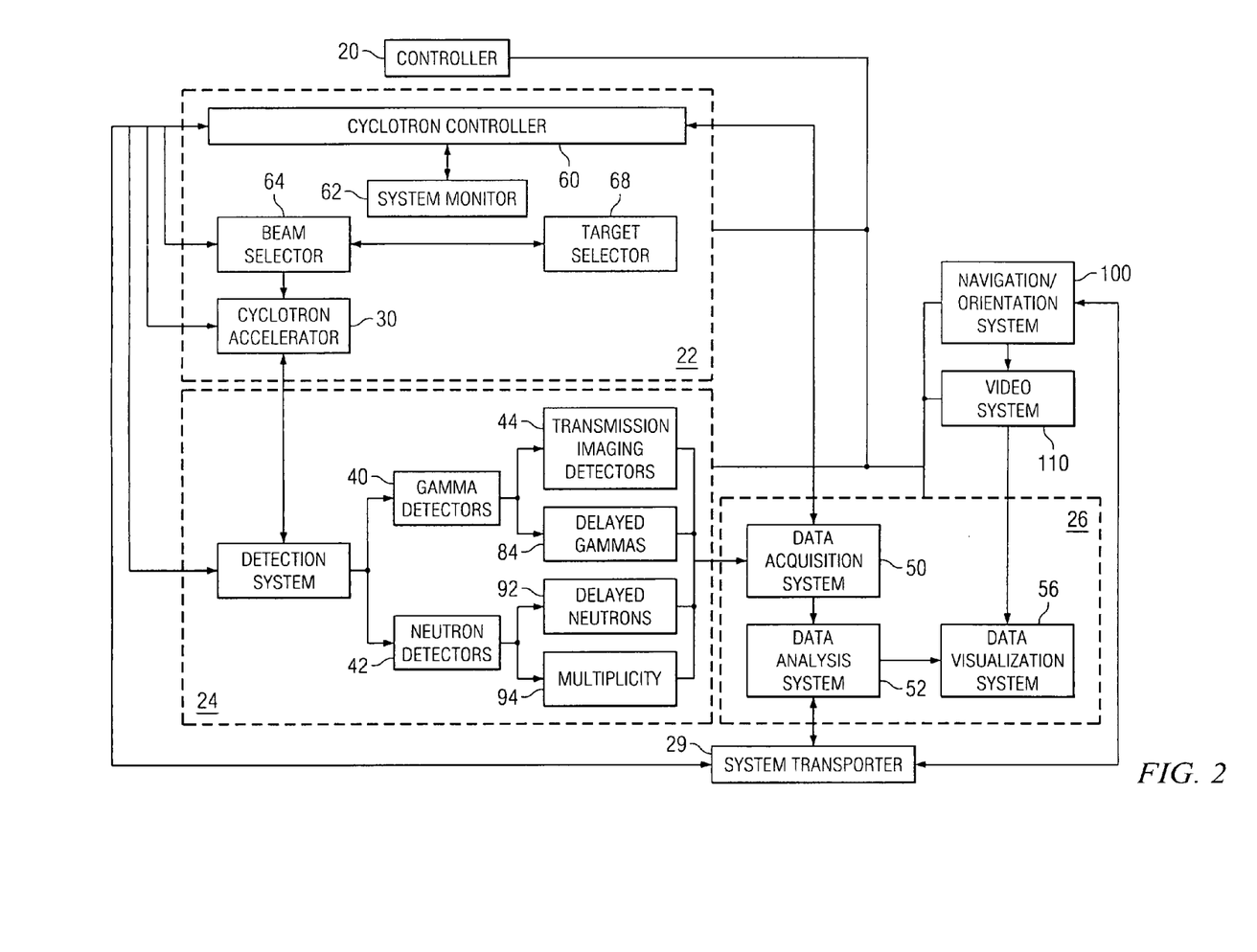

FIGS. 1 and 2 illustrate an embodiment of system 10 that may be used to interrogate contents 14 that may be enclosed in a container 16. System 10 may be used in any suitable application. For example, system 10 may be used to interrogate hidden contents of containers at ports, airports, weigh stations, and/or check points.

In particular embodiments, system 10 may provide multiple detection modes. As an example, system 10 may use neutrons or gamma rays (photons) or both to interrogate contents 14. As another example, system 10 may use different particle energies and/or different pulse rates to interrogate contents 14. As yet another example, system 10 may use pulsed or continuous radiation to interrogate contents 14. In particular embodiments, system 10 may be compact, modular, and/or reconfigurable.

Contents 14 may comprise any of a variety of materials that can be interrogated by system 10. In some cases, contents 14 may comprise nuclear material, such as special nuclear material (SNM). The nuclear material may emit radiation in response to being irradiated, which system 10 may use to analyze contents 14. In some cases, contents 14 may have shielding, such as gamma ray or neutron shielding comprising borated polyethylene, iron, or lead, or other shielding. The shielding may decrease the detectable amount of radiation emitted by contents 14. System 10 may be configured to detect this decreased radiation.

In certain situations, contents 14 may be hidden from view in a container 16. Container 16 may be any suitable container that can hold and/or transport contents 14. For example, container 16 may comprise a shipping or cargo container. In some situations, system 10 may interrogate container 16 while container 16 is on a transport system, such as a truck.

In the illustrated embodiment, system 10 includes a controller 20, a cyclotron (such as a nanotron) system 22, a detector system 24, a data system 26, a display 28, a system transporter 29, a navigation/orientation system 100, and a video system 110. Display 28 presents a report 60 describing contents 14.

Controller 20 controls the operations of system 10. In particular embodiments, controller 20 may send instructions to and/or receive output from systems 22, 24, 26, 28, 29, 100, and/or 110. For example, controller may receive selections, for example, detection mode selections, from a user and send instructions to the systems based on the user's selections.

In particular embodiments, controller 20 receives input detection mode selections. Controller 20 instructs a cyclotron (such as cyclotron system 22) to generate source radiation according to the selections. The source radiation is directed towards contents 14, which emit radiation in response to the source radiation. Controller 20 instructs detector system 26 to detect the emitted radiation.

In particular embodiments, controller 20 receives a selection of a source mode (a "source mode selection") of source radiation to generate to interrogate contents 14. The source mode may be a neutron mode, a gamma ray mode, or a combined neutron-gamma ray mode. In the embodiments, controller 20 instructs cyclotron system 22 to generate source radiation according to the selected source mode.

In particular embodiments, controller 20 receives a selection of particle energy (an "particle energy selection") of the source radiation, and instructs cyclotron system 22 to generate radiation of the selected particle energy. In particular embodiments, controller 20 receives a selection of a pulse frequency (a "pulse frequency selection") of the source radiation, and instructs cyclotron system 22 to generate radiation of the selected pulse frequency.

In particular embodiments, controller 20 receives a selection of continuous or pulsed mode (a "continuous/pulsed selection"), and instructs cyclotron system 22 to generate radiation according to the selected mode. Selection of a continuous or pulsed mode may aid in particular types of detection. For example, the selection may aid in detecting prompt and delayed radiation emitted by contents 14. Prompt radiation is emitted by contents 14 less than one or more microseconds after the fission process, and delayed radiation is emitted by contents 14 more than several microseconds to seconds after the fission process. Pulsed mode may allow for the detection of prompt and/or delayed fission neutrons and/or gammas. Delayed mode may allow for the detection of delayed fission neutrons and/or gammas. As another example, pulsed mode may allow for the detection of specific high energy gamma rays from fast neutrons. As another example, delayed mode may allow for the determination of the ratio of scatter and pair production rates.

In particular embodiments, the user selections may be provided in response to automated analysis made by controller 20. For example, controller 20 may receive results of a previous scan or a rough description of contents 14 and/or container 18. Controller 20 may provide recommendations for optimizing interrogation of contents 14 according to the results or description. Controller 20 may provide any suitable recommendation, such as any recommendation provided herein. Recommendations provided herein may include recommendations that a particular mode may be used for detecting particular type of contents 14.

Cyclotron system 22 generates source radiation used to interrogate contents 14. In particular embodiments, cyclotron system 22 generates neutrons, gamma rays, or both neutrons and gamma rays in response to instructions from controller 20. Cyclotron system 22 may generate mono energetic gamma rays and neutrons in a single nuclear reaction. The mono energetic gamma rays and high energy neutrons may be tuned to provide an optimal signal of interest in nuclear material.

In particular embodiments, cyclotron system 22 may generate radiation of any suitable energy, for example, an energy in the range of 2 to 16 megaelectron volts (MeV), such as 0 to 8 MeV $D^+$, or 0 to 16 MeV $H^+$, or 15 MeV. In particular embodiments, cyclotron system 22 may generate pulsed or continuous radiation. The pulsed radiation may be selected to have any suitable pulse frequency, such as 100 to 500 hertz (Hz), for example, approximately 300 Hz.

Cyclotron system 22 includes a cyclotron accelerator 30, a cyclotron cryocooler 32, a cyclotron controller 60, a system monitor 62, a beam selector 64, and a target selector 68. An example of cyclotron accelerator 30 is described in more detail with reference to FIGS. 3 and 4. Cyclotron system 22 may adjust the type of accelerated particle and/or target material used in cyclotron accelerator 30 to yield different source radiation for inspecting different types of content 14. Beam selector 64 selects particles to accelerate towards target material. Target selector 68 selects target material.

Cyclotron cryocooler 32 cools and/or maintains the temperature of super conducting magnets at cryogenic temperatures. Cyclotron cryocooler 32 may cool without cryogens. Cyclotron controller 60 controls the operation of cyclotron system 22 and may control the operation in response to instructions from controller 20. System monitor 62 monitors the operation of cyclotron system 22.

Detector system 24 detects radiation emitted by contents 14. In particular embodiments, detector system 24 includes one or more gamma detectors 40, one or more neutron detectors 42, and one or more transmission imaging detectors 44. Gamma detectors 40 detect gamma rays emitted from contents 14. Transmission imaging detectors may be used with gamma detectors 40 to detect prompt gamma rays. Neutron detectors 40 detect neutrons 92. Multiplicity 94 may be used with neutron detectors to detect prompt neutrons. Detector system 24 is described in more detail with reference to FIG. 5.

In particular embodiments, detector system 24 may generate image data that can be used to generate an image of contents 14. In particular embodiments, detector 82 may use the difference in absorption between benign materials (such as Fe) and nuclear material to produce high contrast images of contents 14.

Data system 26 collects data from detector system 24, analyzes the data to identify contents 14, and generates a report 60 that describes contents 14. Data system 26 includes a data acquisition system 50, a data analysis system 52, and a data visualization system 56.

Data acquisition system 50 gathers event data, characterizes the data based on relevant attributes, and prepares the data for analysis system 52. Data analysis system 52 analyzes the data in order to describe contents 14. In particular embodiments, data analysis system 52 implements temporal-counting and multiplicity-counting techniques to identify contents 14 and/or locate contents within container 16. Data analysis system 52 may monitor the processes, calculate the levels of confidence based on the accumulated counts, and predict the remaining interrogation time. In particular embodiments, data analysis system 52 may process waveforms for pulse pile up and pulse shaped discrimination, and may also time stamp and store detector waveforms.

Data visualization system 56 places the description of contents 14 into a displayable report 60 and instructs display 28 to display report 60. Display 28 displays report 60. Report 60 may include an image, text, audio, and/or video. Display 28 may comprise any suitable device operable to display report 60, for example, a computer, a handheld device, and/or a television screen. Report 60 may include an identification of contents 14. The identification may identify a threat level and/or material of contents 14. The threat level may indicate the level of threat that contents 14 pose. For example, contents 14 with weapons grade material may be classified as a high threat, while contents 14 with material used for medical purposes may be a low level threat. The identification of the material may indicate the specific material that system 10 has detected. The report may also include the position of contents 14 within container.

System transporter 29 transports system 10. System transporter 29 may be a ground, air, or water transport system, such as an automobile or truck, an airplane, or a boat, respectively. Navigation/orientation system 100 provides the location and orientation of system 10. Video system 110 may record the interrogation of contents and provide a video and/or audio record of the interrogation process.

At least one, some, or all components of system 10 may be integrated in a single transport system 29 for storage, transport, and/or deployment. Examples of transport system 29 include a vehicle (for example, a car or truck), a boat, or an airplane.

A component of system 10 (such as controller 20) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Figure 3:
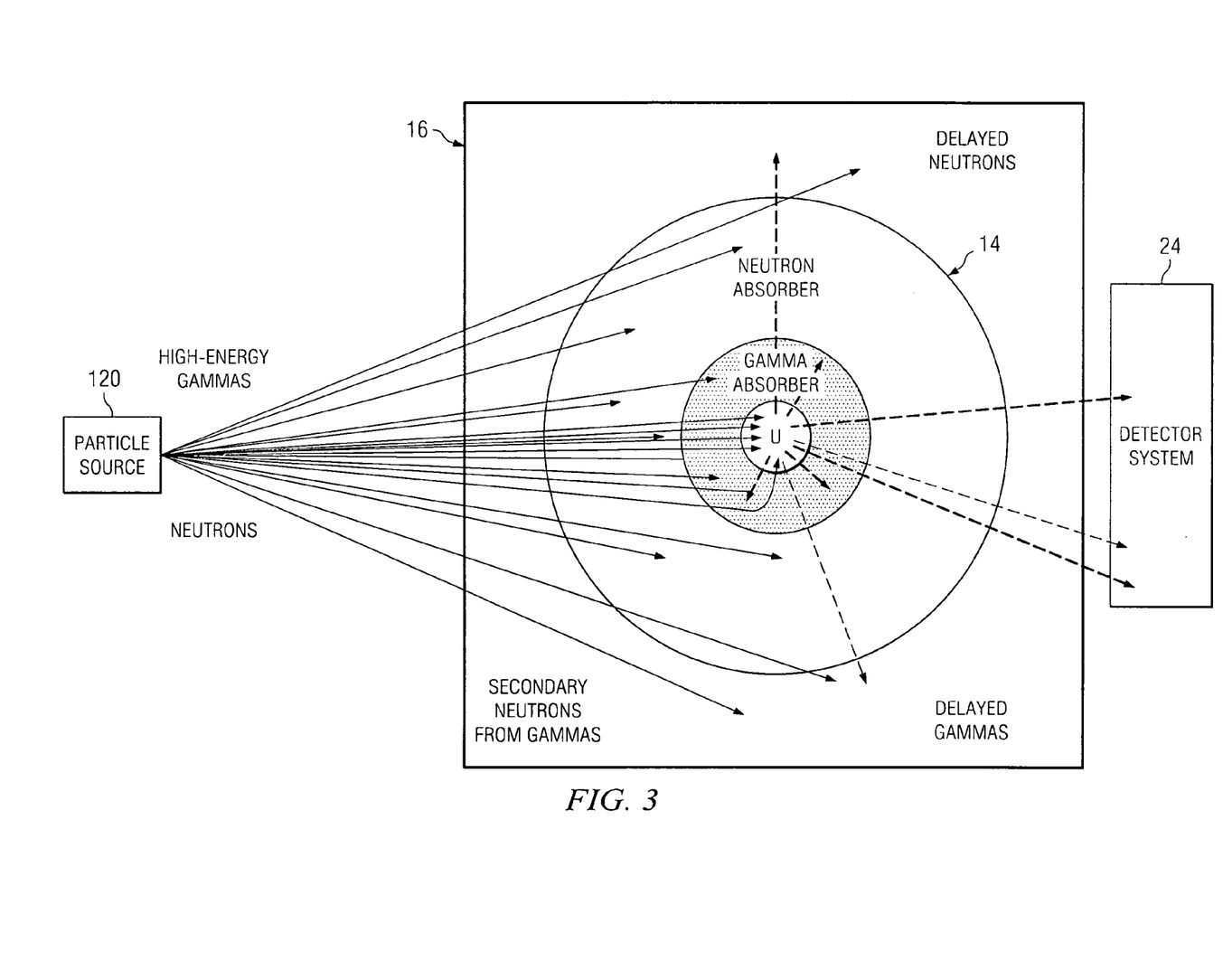
FIG. 3 illustrates an embodiment of a particle source.

FIG. 3 illustrates an embodiment of a particle source 120, such as cyclotron accelerator 30, irradiating contents 14 in container 16 with neutrons and/or gamma rays. The radiation induces nuclear reactions in contents 14. Contents 14 emits radiation characteristic of specific material, that is, contents 14 emit a "fingerprint" radiation signature. Detector system 24 detects the emitted radiation.

Neutrons may induce fission reactions in contents 14, which in turn generate neutrons, gamma rays, and other fission products. In particular embodiments, the energy of the neutrons may be used to determine the composition of the material of contents 14, such as the enrichment of uranium. In an example, a uranium isotope has a particular fission threshold, for example, 238U has a 1 MeV fission threshold. Neutrons with energies below and above the fission threshold may be generated to differentially induce fissions in both isotopes to determine enrichment. The detected radiation may be used to determine the enrichment level.

High energy gamma rays (>5 MeV) may produce photo-fission or photo-neutron reactions in contents 14. The impinging gamma rays may have energies within the peak of the photo-fission cross sections for target material vs. energy. Photo-fission reactions produce a cascade of decaying fission product nuclei, which yields delayed gamma ray emissions characteristic of the fissioning nuclei. Photo-neutron reactions emit prompt neutrons with characteristic spectrum and intensity based upon nuclei involved.

Figure 4:
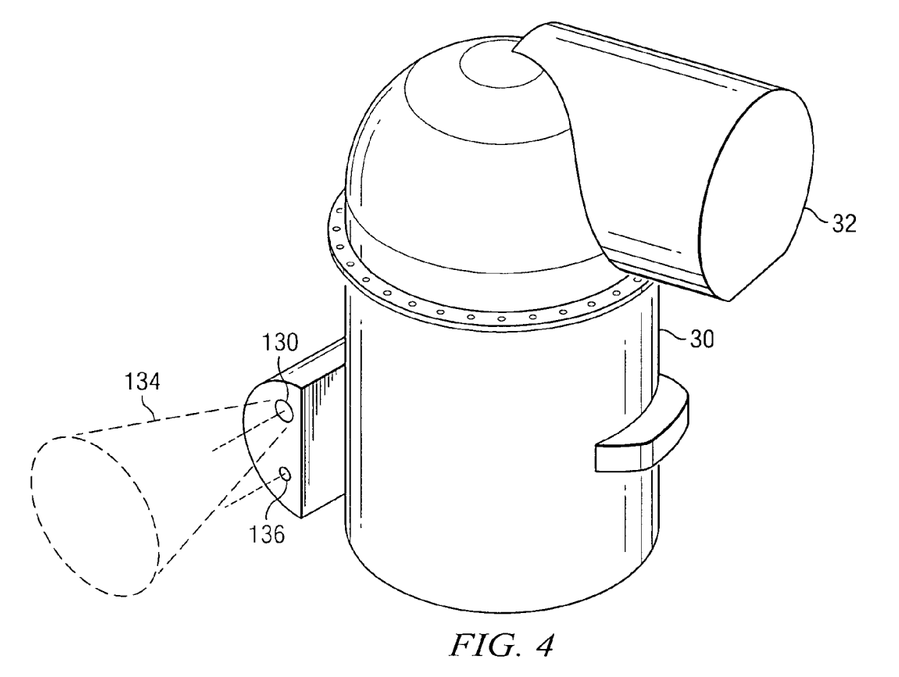
FIG. 4 illustrates examples of a cyclotron accelerator and a cyclotron cooler of a cyclotron system.

FIG. 4 illustrates examples of cyclotron accelerator 30 and cyclotron cooler 32 of cyclotron system 22. In particular embodiments, cyclotron accelerator 30 is a compact cyclotron that accelerates charged particles (such as protons or deuterons) in an accelerating cavity using a high-frequency, alternating voltage. A perpendicular magnetic field causes the particles to spiral almost in a circle so that they re-encounter the accelerating voltage many times. The accelerated particles strike one of several selectable targets located outside of the accelerating cavity and cause reactions. The reactions create mono energetic photons and neutrons as the source radiation. An example of cyclotron accelerator 30 is a nanotron, which is a very small cyclotron.

Cyclotron system 22 may adjust the type and energy of accelerated particle and/or target material used in cyclotron accelerator 30 to yield different source radiation for inspecting different types of content 14. Any suitable combination of accelerated particles and target may be used. For example, 5 MeV deuterons and an enriched $^{11}$B boron isotope target may be used. The particles and target may produce mono energetic photons at energies of 4.4 and 15.1 MeV, with less intense emissions at 10.7 and 12.7 MeV, as well as neutrons with energies of 0 to 8, 13, and 18 MeV.

The target may be selected based on its reaction cross-section. For example, a $^{11}$B boron isotope target has a large cross-section for the $^{11}$B(d,n$\alpha$)$^{12}$C reaction, approximately 1 mb/steradian. Accelerated particles and targets may be selected based on the desired source radiation. For example, protons may be used to generate 9.2 MeV and 6 to 7 MeV gamma rays. Differential absorption of gammas in transmission is a useful tool.

The different combinations of accelerated particle and target material may yield different reactions that are better suited for interrogating different types of contents 14. For example, $^{19}$F(p,$\alpha$) and $^{52}$Cr(p,n) reactions produce photon-only and neutron-only spectra, respectively. These reactions may be better suited for interrogating shielded contents 14. As another example, a Cr(p,n) reaction yields neutrons above and below the one MeV fission threshold of $^{238}$U and $^{232}$Th. This reaction may be used to identify and differentiate fissile and non-fissile material.

Cyclotron system 22 may operate in a continuous or pulsed mode. In the pulsed mode, the ion source and radio frequency may be modulated to provide pulsing structures of a few hertz to megahertz. The timing of cyclotron system may be coupled to a radio frequency power supply that operates at a frequency of 110 MHz.

Cyclotron accelerator 30 may have any suitable size, weight, and power consumption. In particular embodiments, cyclotron accelerator 30 may be compact, which may be less than four feet tall (such as approximately 3 feet tall) and less than two feet in diameter (such as approximately 20 inches in diameter). In particular embodiments, cyclotron accelerator 30 may weigh less than 500 pounds (lbs), for example, approximately 400 lbs. In particular embodiments, the power consumption may be less than five kilowatts (kW), for example, approximately three kW.

In particular embodiments, cyclotron accelerator 30 includes ports. The ports may include an output beam port 130, a laser beam port 134, and a video camera port 136.

Output beam port 130 outputs the output beam, and may have an alignment laser. Laser beam port 134 couples to a laser beam generator, and video camera port 136 couples to a video camera.

In other embodiments, cyclotron accelerator 30 may be any other suitable radiation source. Examples of other sources include electron linacs, neutron generators, broad-spectrum x-ray sources, low-energy monochromatic gamma-ray sources, and bremsstrahlung sources.

Figure 5:
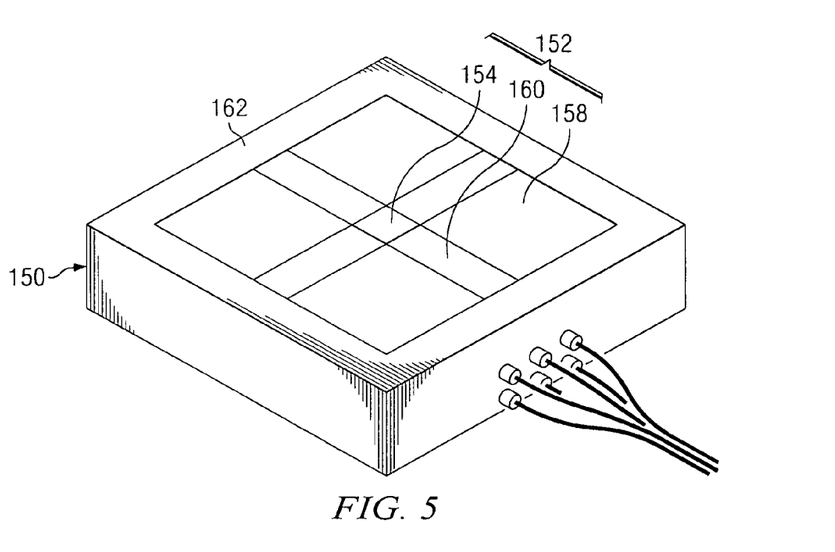
FIG. 5 illustrates an example of a detector module of a detector system.

FIG. 5 illustrates an example of a detector module 150 of detector system 24. Detector module 150 includes one or more detectors 152 and a detector housing 162. Detectors 152 may include any suitable detector operable to detect radiation emitted from contents 14.

In particular embodiments, detectors 152 include one or more gamma ray detectors 154, one or more charged particle detectors 158, and one or more neutron detectors 160. Gamma ray detector 154 may be any suitable detector that detects gamma rays, such as a bismuth germinate (EGO) detector, which has a detection efficiency for high energy photons. Particle detector 158 may be any suitable detector that detects particles, such as a scintillator detector. Neutron detector 160 may be any suitable detector that detects neutrons, and may include helium-3 ($^3$He) proportional counters.

Detector housing 162 provides support and protection for detector module 150. In certain embodiments, one or more detectors 152 may be embedded in polyethylene. The polyethylene packing may be used to provide neutron moderation for the detectors. Detector module 150 may be any suitable size, for example, less than a meter square, for example, approximately 0.5 meter square.

In particular embodiments, detector system 24 may comprise one or more detector modules 150, for example, five to ten modules 150, such as eight modules 150. Each detector module 150 may be positioned on a gantry or tripod.

Figure 6:
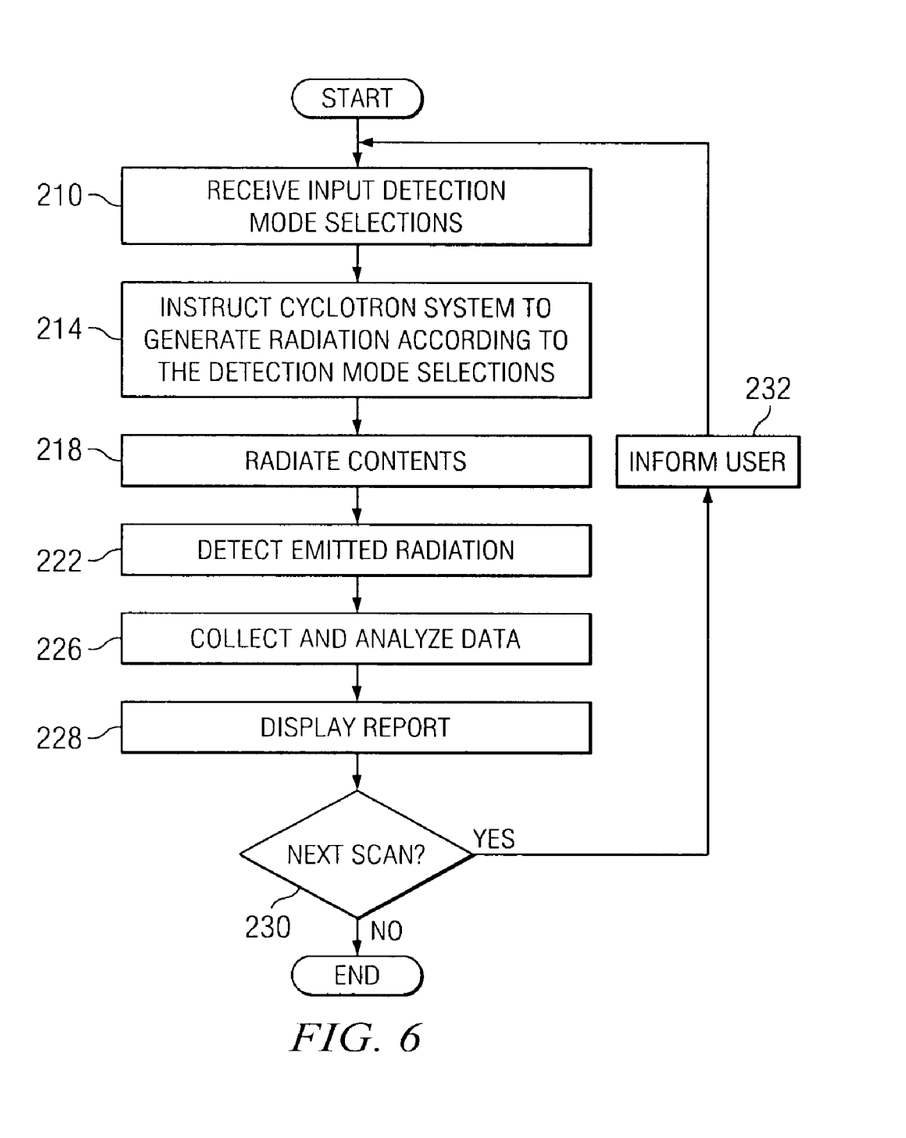
FIG. 6 illustrates an example of a method that may be used by the system of FIG. 1 to interrogate hidden contents of a container.

FIG. 6 illustrates an example of a method that may be used by system 10 to interrogate hidden contents 14 of container 16. The method starts at step 210, where controller 20 receives one or more input detection mode selections from a user. In particular embodiments, the detection mode selections may include a selection of using neutrons or gamma rays or both to interrogate contents 14; selected particle energies of the radiation used to interrogate contents 14; selected pulse rates used to interrogate contents 14; and/or a selection of pulsed or continuous radiation.

Controller instructs cyclotron system to generate source radiation according to the detection mode selections at step 214. Cyclotron system 22 irradiates contents 14 with the source radiation at step 218. Any suitable scan schedule may be used. For example, in an initial scan, cyclotron system 22 may run in a mode that alternates on or 1-2½ seconds followed by an off period of 1-2½ seconds for one minute.

In response, contents 14 emit radiation. Detector system 24 detects the emitted radiation at step 224. Data system collects and analyzes the emitted radiation at step 226. Prompt and delayed neutrons may be collected, and the count rates of each detector 152 may be monitored. Data system 26 may generate report 60 that describes contents 14 and may instruct display 26 to display report 60. Display 28 displays report 60 at step 228.

A next scan may be performed at step 230. If contents 14 cannot be adequately described, a subsequent scan may be performed. If a next scan is to be performed, the method proceeds to step 232, where data analysis system 52 provides recommendations to the user for performing the subsequent scan. The recommendations may involve any suitable adjustment. Examples of adjustments include: detecting the emitted radiation (or counting) for a longer period of time; using a different source radiation; using different accelerated particles or target; or increasing the pulse rate of the source radiation.

After providing the recommendations, the method returns to step 210, where input detection mode selections are received. If a next scan is not performed at step 230, the method ends.

Figure 7A:
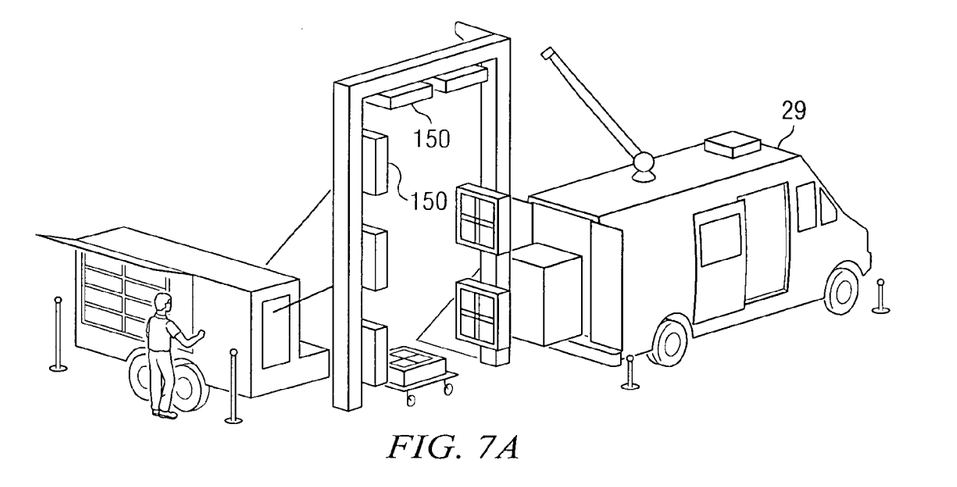
FIG. 7A and FIG. 7B illustrate examples of configurations of the system of FIG. 1.
Figure 7B:
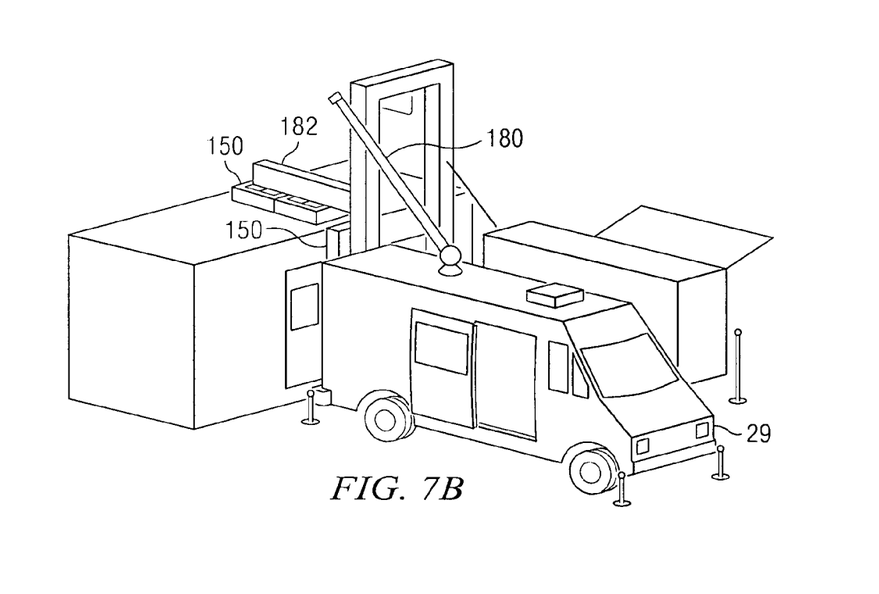

FIG. 7A and FIG. 7B illustrate examples of configurations of system 10. FIG. 7A illustrates a closed configuration deployment. Detector modules 150 are mounted on a gantry, and contents 14 may pass through the gantry. FIG. 7B illustrates an open configuration deployment of system 10. Detector modules 150 are mounted on structures 180, and contents 14 may pass under and to the side of structures 180. Cyclotron accelerator 30 may be positioned with a crane and gantry system at the height of contents 14.

In an example of operation, container 16 is moved at a speed of approximately 0.4 meters per minute by detector modules 150. Cyclotron accelerator 30 may operate at a 1 second on/1 second off mode. If detector modules 150 are approximately 0.5 meters wide, each horizontal location within container 16 is within one detector width of a centerline of the detector plane for approximately 180 seconds, which may allow system 10 to identify suspicious regions based on gross delayed counting. As container 16 is moved, a plot of delayed counts versus position along container 14 may be graphed. If the delayed counts indicates suspicious contents 14, container 16 may be slowed or stopped to conduct a secondary count.

Modifications, additions, or omissions may be made to the systems described in this document without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods described in this document without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
    a controller configured to:
        receive one or more input selections comprising a source mode selection of a source mode of source radiation to generate to interrogate contents, the source mode selection comprising a selected one of a neutron mode, a gamma ray mode, or a combined neutron-gamma ray mode; and
        instruct a cyclotron to generate the source radiation according to the source mode selection;
    a detector system configured to detect emitted radiation emitted from the contents in response to the source radiation; and a data system configured to:
  analyze the emitted radiation; and
  describe the contents according to the analysis.
2. The system of claim 1, the controller configured to:
receive the one or more input selections by:
  receiving a particle energy selection of a particle energy of the source radiation; and
instruct the cyclotron to generate the source radiation by:
  instructing the cyclotron to generate the source radiation having the selected particle energy.
3. The system of claim 1, the controller configured to:
receive the one or more input selections by:
  receiving a pulse frequency selection of a pulse frequency of the source radiation; and
instruct the cyclotron to generate the source radiation by:
  instructing the cyclotron to generate the source radiation of the selected pulse frequency.
4. The system of claim 1, the controller configured to:
receive the one or more input selections by:
  receiving a continuous/pulse selection of a pulsed mode or a continuous mode, the pulsed mode representing source radiation provided in a plurality of pulses, the continuous mode representing source radiation provided continuously; and
instruct the cyclotron to generate the source radiation by:
  instructing the cyclotron to generate source radiation of the selected mode.
5. The system of claim 1, the detector system configured to detect emitted radiation by:
  detecting prompt emitted radiation, the prompt emitted radiation emitted by the contents less than one microsecond after a fission process.
6. The system of claim 1, the data system configured to provide a recommendation for a scan, the recommendation comprising an adjustment selected from the following adjustment:
  detecting the emitted radiation for a longer period of time;
  using a different source radiation; and
  increasing a pulse rate of the source radiation.
7. The system of claim 1, the detector system comprising one or more detector modules, each detector module comprising:
  one or more gamma ray detectors; and
  one or more neutron detectors.
8. The system of claim 1, the cyclotron configured to generate different source radiation by selecting a different accelerated particle or a different target.
9. A method comprising:
  receiving, by a controller, one or more input selections comprising a source mode selection of a source mode of source radiation to generate to interrogate contents, the source mode selection comprising a selected one of a neutron mode, a gamma ray mode, or a combined neutron-gamma ray mode;
  instructing, by the controller, a cyclotron to generate the source radiation according to the source mode selection;
  configured to detecting, by a detector system, emitted radiation emitted from the contents in response to the source radiation;
  analyzing, by a data system, the emitted radiation; and
  describing, by the data system, the contents according to the analysis.
10. The method of claim 9:
  the receiving the one or more input selections further comprising:
    receiving a particle energy selection of a particle energy of the source radiation; and
  the instructing the cyclotron to generate the source radiation further comprising:
    instructing the cyclotron to generate the source radiation having the selected particle energy.
11. The method of claim 9, the controller configured to:
  the receiving the one or more input selections further comprising:
    receiving a pulse frequency selection of a pulse frequency of the source radiation; and
  the instructing the cyclotron to generate the source radiation further comprising:
    instructing the cyclotron to generate the source radiation of the selected pulse frequency.
12. The method of claim 9, the controller configured to:
  the receiving the one or more input selections further comprising:
    receiving a continuous/pulse selection of a pulsed mode or a continuous mode, the pulsed mode representing source radiation provided in a plurality of pulses, the continuous mode representing source radiation provided continuously; and
  the instructing the cyclotron to generate the source radiation further comprising:
    instructing the cyclotron to generate source radiation of the selected mode.
13. The method of claim 9, the detecting emitted radiation further comprising:
  detecting prompt emitted radiation, the prompt emitted radiation emitted by the contents less than one microsecond after a fission process.
14. The method of claim 9, further comprising providing a recommendation for a scan, the recommendation comprising an adjustment selected from the following adjustment:
  detecting the emitted radiation for a longer period of time;
  using a different source radiation; and
  increasing a pulse rate of the source radiation.
15. The method of claim 9, the detector system comprising one or more detector modules, each detector module comprising:
  one or more gamma ray detectors; and
  one or more neutron detectors.
16. The method of claim 9, the cyclotron configured to generate different source radiation by selecting a different accelerated particle or a different target.
17. A system comprising:
  a controller configured to:
    receive one or more input selections comprising a source mode selection of a source mode of source radiation to generate to interrogate contents, the source mode selection comprising a selected one of a neutron mode, a gamma ray mode, or a combined neutron-gamma ray mode; and
    instruct a cyclotron to generate the source radiation according to the source mode selection, the cyclotron configured to generate different source radiation by selecting a different accelerated particle or a different target;
  a detector system configured to detect emitted radiation emitted from the contents in response to the source radiation;
  the detector system comprising one or more detector modules, each detector module comprising:
    one or more gamma ray detectors; and
    one or more neutron detectors; and
  a data system configured to:
    analyze the emitted radiation; and
    describe the contents according to the analysis.

18. The system of claim 17, the controller configured to:
receive the one or more input selections by:
- receiving a particle energy selection of a particle energy of the source radiation; and instruct the cyclotron to generate the source radiation by:
- instructing the cyclotron to generate the source radiation having the selected particle energy.

19. The system of claim 17, the controller configured to:
receive the one or more input selections by:
- receiving a pulse frequency selection of a pulse frequency of the source radiation; and instruct the cyclotron to generate the source radiation by:
- instructing the cyclotron to generate the source radiation of the selected pulse frequency.

20. The system of claim 17, the controller configured to:
receive the one or more input selections by:
- receiving a continuous/pulse selection of a pulsed mode or a continuous mode, the pulsed mode representing source radiation provided in a plurality of pulses, the continuous mode representing source radiation provided continuously; and instruct the cyclotron to generate the source radiation by:
- instructing the cyclotron to generate source radiation of the selected mode.

\* \* \* \* \*